United States Patent
Beattie, Jr. et al.

(10) Patent No.: US 10,638,288 B2
(45) Date of Patent: Apr. 28, 2020

(54) EMBEDDED DEVICE IDENTIFICATION INFORMATION IN PACKETIZED COMMUNICATIONS

(71) Applicants: AT&T Intellectual Property I, L.P., Atlanta, GA (US); AT&T Mobility II LLC, Atlanta, GA (US)

(72) Inventors: James Gordon Beattie, Jr., Bergenfield, NJ (US); James Hollister, Camarillo, CA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 135 days.

(21) Appl. No.: 15/594,821

(22) Filed: May 15, 2017

(65) Prior Publication Data

US 2018/0331881 A1 Nov. 15, 2018

(51) Int. Cl.
*H04W 4/70* (2018.01)
*H04W 24/02* (2009.01)
(Continued)

(52) U.S. Cl.
CPC .............. *H04W 4/70* (2018.02); *H04W 4/18* (2013.01); *H04W 24/02* (2013.01); *H04W 4/06* (2013.01)

(58) Field of Classification Search
CPC ........... H04L 29/0863; H04L 29/08306; H04L 61/2503; H04W 4/005; H04W 4/18; H04W 4/70; H04W 24/02; H04W 4/06
See application file for complete search history.

(56) References Cited

U.S. PATENT DOCUMENTS 7,184,777 B2 2/2007 Diener et al.
7,417,998 B2 8/2008 Lee
(Continued)

FOREIGN PATENT DOCUMENTS

JP 2007295278 11/2007
WO WO 2012/094981 7/2012
(Continued)

OTHER PUBLICATIONS

Hall et al., "Enhancing Intrusion Detection in Wireless Networks Using Radio Frequency Fingerprinting (Extended Abstract)," IASTED International Conference on Communications, Internet, and Information Technology (CIIT 2004), Nov. 22-24, 2004.
(Continued)

*Primary Examiner* — Walter J Divito
*Assistant Examiner* — Anthony Luo
(74) *Attorney, Agent, or Firm* — Hartman & Citrin LLC

(57) ABSTRACT

Concepts and technologies are disclosed herein for a device identification message embedded in a packetized communication. A computing device can create a device identification message based on identification information associated with the computing device. The computing device can encode the device identification message using a compact code to generate an encoded device identification message including a plurality of elements associated with the compact code. The computing device can fragment the encoded device identification message into the plurality of elements and add a respective element to each of a plurality of packetized communications of the computing device. The computing device can send the packetized communications, which can be received by a device and used by the device to mitigate interference caused by the computing device.

20 Claims, 8 Drawing Sheets

(51) Int. Cl.
*H04W 4/18* (2009.01)
*H04W 4/06* (2009.01)

(56) References Cited

U.S. PATENT DOCUMENTS

| | | | |
|---|---|---|---|
| 7,426,190 B2 | 9/2008 | Manjeshwar et al. | |
| 7,826,426 B1 | 11/2010 | Bharghavan et al. | |
| 7,920,618 B2 | 4/2011 | Lyle et al. | |
| 8,520,502 B2 | 8/2013 | Tenny et al. | |
| 8,634,848 B1 | 1/2014 | Bozarth et al. | |
| 9,071,474 B1 | 6/2015 | Zhang | |
| 9,161,332 B2 | 10/2015 | Nagata | |
| 9,170,318 B1 | 10/2015 | Bozarth et al. | |
| 9,473,412 B2 | 10/2016 | Hui et al. | |
| 9,535,155 B2 | 1/2017 | Kravets et al. | |
| 2008/0212700 A1* | 9/2008 | Han | H04L 1/0625 375/260 |
| 2010/0062802 A1* | 3/2010 | Amram | H04B 7/026 455/556.1 |
| 2014/0254466 A1* | 9/2014 | Wurster | H04L 12/189 370/312 |
| 2016/0373198 A1* | 12/2016 | Natsukawa | H04L 69/03 |
| 2017/0026269 A1 | 1/2017 | Liang et al. | |
| 2018/0109393 A1* | 4/2018 | Campbell | H04B 11/00 |

FOREIGN PATENT DOCUMENTS

| | | |
|---|---|---|
| WO | WO 2013/033907 | 3/2013 |
| WO | WO 2013/082710 | 6/2013 |
| WO | WO 2017/035297 | 3/2017 |

OTHER PUBLICATIONS

Danev et al., "Attacks on Physical-layer Identification," Proceedings of the Third ACM Conference on Wireless Network Security (WiSec '10), Mar. 22-24, 2010, ACM 2010.

Danev et al., "Transient-based Identification of Wireless Sensor Nodes," Proceedings of the 2009 International Conference on Information Processing in Sensor Networks (IPSN '09), Apr. 15-18, 2009, ACM 2009.

Brik et al., "Wireless Device Identification with Radiometric Signatures," Proceedings of the 14th ACM International Conference on Mobile Computing and Networking (MobiCom '08), Sep. 14-19, 2008, ACM 2008.

Rasmussen et al., "Implications of Radio Fingerprinting on the Security of Sensor Networks," 2007 Third International Conference on Security and Privacy in Communications Networks and the Workshops (SecureComm 2007), Sep. 17-21, 2007, pp. 331-340.

* cited by examiner

EMBEDDED DEVICE IDENTIFICATION INFORMATION IN PACKETIZED COMMUNICATIONS

BACKGROUND

Wireless devices have become ubiquitous such that wireless transmitters are included in a wide variety of devices and technologies. Such wireless transmitters can found in almost every industry and involved in almost all aspects of modern life. For example, household appliances and household controls, such as wireless thermostat controllers, security systems, smoke alarm units and, of course, entertainment systems and equipment, are increasingly taking advantage of wireless communications. Wireless devices, equipment and components are also being used increasingly outside of our homes in industrial facilities, retail establishments and service centers, such as medical facilities, as well as in items used daily outside of homes including our vehicles and mobile computing devices. Further, the use of wireless technologies is a major component in the trend for an Internet of Things ("IoT"), in which vast numbers and varieties of devices used daily can communicate to each other and over external networks via packetized network communications.

Many of these devices make use of known wireless communications technologies for packetized networks including WI-FI, WI-MAX, cellular, ZIGBEE, BLUETOOTH, Near Field Communications ("NFC"), and other wireless packetized network communications systems. Transmitters and components that allow devices to send wireless transmissions for many such systems are often put into service and/or connected for use with various devices in configurations and arrangements that interfere with existing systems and devices. The existing systems and devices encountering these interferences and conflicts are essentially victimized, in that users or entities for those systems must expend resources to determine the existence of the interference when conflicts or service losses are encountered, locate the source of the conflict and the responsible conflicting device, and then troubleshoot options for overcoming the conflict.

In many situations, gaining physical or operational access to a specific device, site or source that is providing an interfering signal or is conflicting with wireless communications can be difficult or impossible even after the source has been identified. These situations can further limit the options and abilities of victimized systems for identifying and mitigating the source(s) of interference, and can waste additional unnecessary time and resources while attempting to troubleshoot and resolve conflicts that can be difficult or even impossible to resolve without sufficient access or information.

SUMMARY

The present disclosure is directed to a device identification message embedded in a packetized communication sent by a computing device. According to some embodiments of the concepts and technologies described herein, a computing device can create a device identification message based on identification information associated with the computing device. The computing device can encode the device identification message using a compact code to generate an encoded device identification message including elements associated with the compact code. The computing device can fragment the encoded device identification message into the elements associated with the compact code and add a respective one of the elements to each of a plurality of packetized communications of the computing device. The computing device can send the packetized communications, which can be received by a device and used by the device to mitigate interference caused by the computing device.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
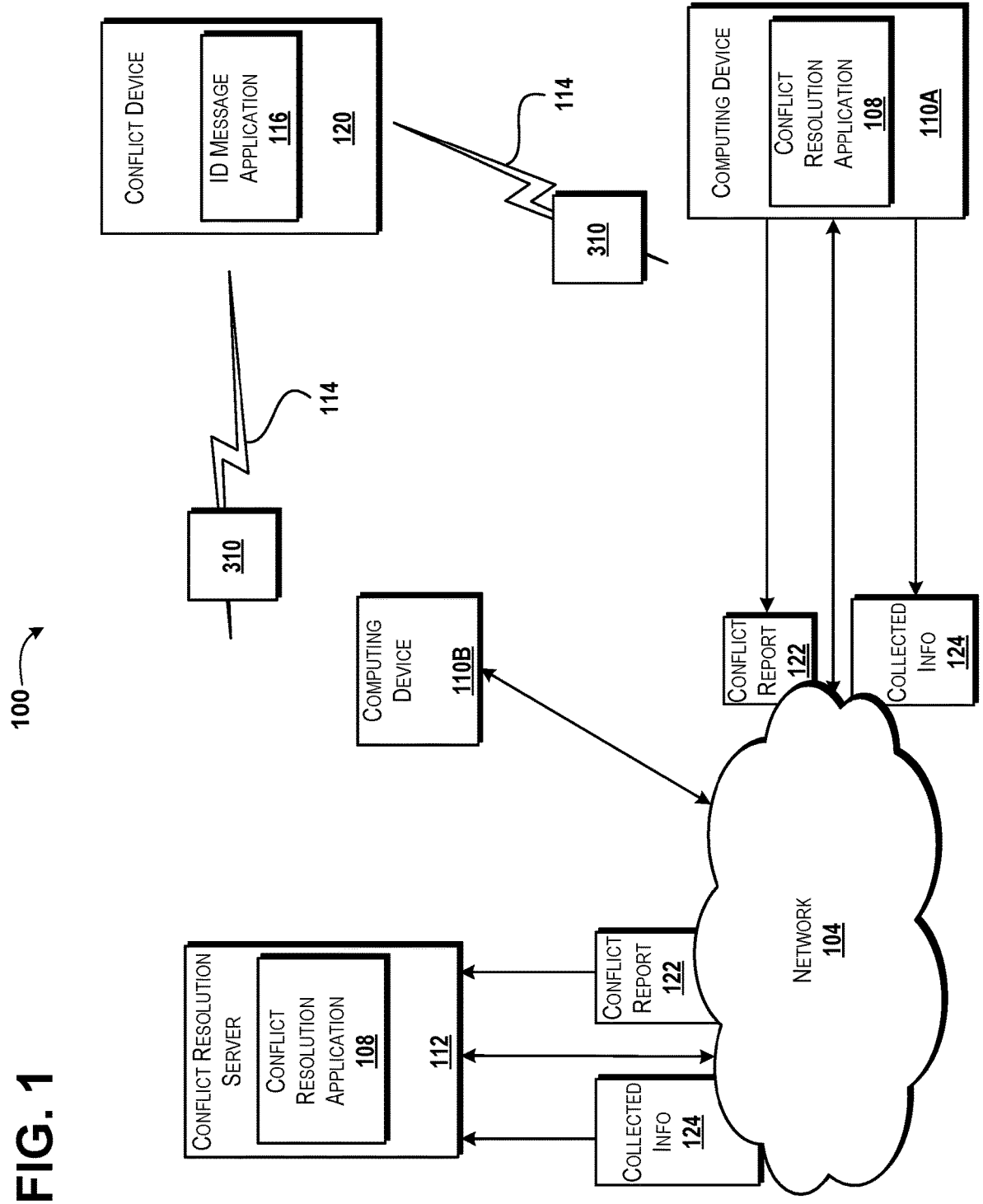
FIG. 1 is a system diagram of an illustrative operating environment for various embodiments of the concepts and technologies described herein including computing devices communicating over a network.

The following detailed description is directed to a device identification message embedded in a series of packetized communications and to conflict resolution using the same. Many devices that transmit over wireless packetized networks have a media access code ("MAC") address assigned to the transmitter, which typically identifies the manufacturer and transmission details about the transmitter. The MAC address of transmitting devices is often included in their transmissions. However, many devices and transmission technologies do not send or make it a practice to transmit their MAC address information. Further, even if included in a transmission, knowing the MAC address of a conflicting device can often provide very little assistance with identifying necessary details about the device, troubleshooting the interference, or enabling contact with an entity responsible for managing the device and its operations. According to some embodiments of the concepts and technologies described herein, a device identification message can be created to provide identification and description information about a device. The device can embed the device identification message within its transmissions over a packetized network, which can be helpful for conflict resolution and for other purposes, such as improving network operations. The device identification message can also provide contact information of an entity responsible for the device that can be used to contact the entity about issues related to the device including conflicts or interference situations.

In the event of a conflict or interference situation occurring that involves the device, information can be quickly obtained about the device from the device identification message, which can help troubleshoot and overcome the conflict situation. In addition, contact information for a person, manager, company or other entity who is responsible for the device can also be obtained from the device identification message, which can further help resolve conflicts related to the device. If such a person or entity needs to be contacted regarding the conflict or interference situation, the contact information of the device identification message can greatly simplify and speed up the conflict resolution process.

The device identification message can be encoded using a compact code to generate an encoded device identification message. In some embodiments, the encoded device identification message can be fragmented into elements of the compact code making up the encoded device identification message such that the encoded device identification message can be sent, element-by-element, over a series of packetized communications without significantly increasing the size of the packetized communications or communication speeds. The elements of the encoded device identification message can be added synchronization headers of the packetized communications. The size of the elements can be based on a jitter tolerance and operational amount of jitter associated with a communications protocol of the packetized communications. In some embodiments, the compact code used can be International Morse Code, which is universally understood and can easily be decoded. The elements of the encoded device identification message can be sent repeatedly from the device in subsequent transmissions and series of transmissions.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for a device identification message embedded in a packetized communication and conflict resolution using the same will be described, according to an illustrative embodiment. The operating environment 100 shown in FIG. 1 includes computing devices 110A-110B, a conflict resolution server 112, and a conflict device 120. The computing devices 110A-110B, the conflict device 120, and the conflict resolution server 112 can operate in communication with and/or as part of a communications network ("network") 104, though this is not necessarily the case. Each of the computing devices 110A-110B, the conflict resolution server 112, and the conflict device 120 can send packetized communications over the network 104. According to embodiments, the conflict device 120 operates in a manner that interferes with, conflicts with, or otherwise impacts communications associated with one or more of the computing devices 110A-110B. For example, the conflict device 120 can be operating in the same frequency band or range as the computing devices 110A-110B, causing radio frequency signals of the computing devices 110A-110B to be disturbed by unwanted radio frequency signals 114 of the conflict device 120. For example, the conflict device 120 and the computing devices 110A-110B can each utilize the Industrial Scientific and Medical ("ISM") band, which results in a high mutual interference between the devices. Additionally or alternatively, the conflict device 120 can be transmitting at a higher power than the computing devices 110A-110B, which can cause degradation of the overall performance of the computing devices 110A-110B. No matter the reason for the interference caused by the conflict device 120, the outcome of the interference can be an increase in packet loss rate for the computing devices 110A-110B, which in turn can cause an increase in network traffic due to retransmissions resulting in a decrease in the performance and efficiency of the overall network. The concepts and technologies disclosed herein for a device identification message embedded in a packetized communication and conflict resolution using the same improve the performance and efficiency of the overall network by enabling mitigation of such interference.

According to various embodiments, the functionality of the computing devices 110A-110B and the conflict device 120 can be provided by one or more mobile telephones, smartphones, tablet computers, slate computers, smart watches, smart glasses (e.g., the GOOGLE GLASS family of products), other wearable devices, other smart devices, IoT devices, security devices, media playback devices, televisions, set-top devices, navigation devices, connected cars, laptop computers, notebook computers, ultrabook computers, netbook computers, server computers, computers of other form factors, computing devices of other form factors, other computing systems, other computing devices, and/or the like. It should be understood that the functionality of the computing devices 110A-110B and the conflict device 120 can be provided by a single device, by two or more similar devices, and/or by two or more dissimilar devices. Based on the above, however, it should be understood that the described embodiment is illustrative, and therefore should not be construed as being limiting in any way.

According to various embodiments, the functionality of the conflict resolution server 112 can be provided by one or more web servers, desktop computers, other computing systems, and the like. It should be understood that the functionality of the conflict resolution server 112 can be provided by a single device, by two similar devices, and/or by two or more dissimilar devices. For example, the functionality of the conflict resolution server 112 can be provided by multiple servers in a server farm or other cloud computing platform, if desired. For purposes of describing the concepts and technologies disclosed herein, the conflict resolution server 112 is described herein as a single device. Based on the above, however, it should be understood that the described embodiment is illustrative, and therefore should not be construed as being limiting in any way.

The conflict device 120 can execute an identification ("ID") message application 116. The ID message application 116 can be configured to determine identification information associated with the conflict device 120. According to embodiments, the identification information includes information identifying an owner of the conflict device 120; information identifying an entity associated with the conflict device 120; contact information for the owner and/or entity including, for example, an address, a telephone number, and/or an email address; a Federal Communications Commission ("FCC") Registration Number ("FRN") or other FCC type acceptance number if the conflict device 120 is a licensed device; location information of the conflict device 120, such as Global Positioning System ("GPS") coordinates of the conflict device; information identifying the conflict device 120, such as a model number of the conflict device 120, a serial number of the conflict device 120, and/or a name associated with the conflict device 120, such as "sprinkler controller #2 building 3"; any other information that can be used to identify the conflict device 120 and/or a user/entity associated with the conflict device 120; and/or any combination thereof. In some embodiments, the identification information includes identity and contact information for a third party service associated with the conflict device 120. Such an option can allow the owner to maintain anonymity if desired while still providing information for being contacted in the event of a conflict.

In some embodiments according to concepts and technologies discussed herein, the identification information can be provided to the ID message application 116 of the conflict device 120 by a user or entity, such as via input/output devices 708 (see FIG. 8) that allow a user/entity to interface with the ID message application 116. In other embodiments, the ID message application 116 can attain the identification information from the ID message application 116 itself and/or the conflict device 120. For example, all of some of the identification information can be hardcoded into the source code of the ID message application 116 and/or one or more other program modules executed by the conflict device 120. All or some of the identification information can be preloaded on the conflict device 120. Additionally or alternatively, all of some of the identification information can be coded on an integrated circuit of the conflict device 120. According to embodiments, the ID message application 116 can further be configured to render the conflict device 120 nonoperational if the ID message application 116 determines that no identification information or incomplete identification information associated with the conflict device 120 is available. For instance, if the ID message application 116 determines that no identification information or incomplete identification information associated with the conflict device 120 is available, the ID message application 116 can prevent the conflict device 120 from sending packetized communications over the network 104.

The ID message application 116 can further be configured to create a device identification message 210, as described further below with reference to FIG. 2, based on at least a portion of the identification information that the ID message application 116 receives or determines. In addition, the ID message application 116 can encode the device identification message 210 via a compact code to create an encoded device identification message 210', as described further below with reference to FIG. 2. The compact code used to create an encoded device identification message, such as the encoded device identification message 210', can be International Morse Code; American Standard Code for Information Interchange ("ASCII"); or any other code that can be fragmented into elements capable of being embedded in one or more packets sent by a device, such as the conflict device 120. Encoding the device identification message 210 into a compact code can reduce the overall size of the message and simplify fragmenting the message. Although the description set forth herein focuses on using International Morse Code to encode the device identification message 210, other compact codes can be used, as set forth above International Morse Code includes a set of characters. Each character of International Morse Code represents a letter, a number, a punctuation mark, or a procedural signal. Each character of International Morse Code is made up of one or more of a first element (e.g., dot/"•") and/or a second element (e.g., dash/"-"). Considering the set of characters of International Morse Code, an encoded device identification message, such as the encoded device identification message 210', generated from encoding a device identification message, such as the device identification message 210, would include combinations of dots and dashes as well as spaces. The spaces in the encoded device identification message 210' can designate one character of a word from the next character of the word and one or more characters making up the word from one or more characters making up another word. The space between characters of a word can have a first interval, and the space between words can have a second interval in order to identify one type of space from another. According to embodiments, the first interval is smaller than the second interval.

The ID message application 116 can also fragment the encoded device identification message 210' into the elements of the compact code used to generate the encoded device identification message 210'2. For example, considering FIG. 2, the first two letters of the word "Company" encoded using International Morse Code as "- • - • - - -" can be fragmented into the following elements: "-", "•", "-", "•", "first space interval", "-", "-", "-". As discussed further below with reference to FIG. 3, one or more of the elements of the encoded device identification message 210' can be determined to be added into each of a series of packets, such as a data packet 310 (also referred to herein as "packet" and "packetized communication"), sent by the conflict device 120. The ID message application 116 can then add the one or more elements to the data packet 310. The ID message application 116 can continue to add and send the elements of the encoded device identification message 210' in subsequent series of transmissions sent by the conflict device 120. As such, other devices, such as the computing device 110A, that receive transmissions sent by the conflict device 120 can determine, from the elements embedded in the packets 310 of the interfering signals 114 of the conflict device 120, identification information associated with the conflict device 120. A user of the computing device 110A can use the identification information associated with the conflict device 120 to mitigate the interference caused by the conflict device 120, as described further herein.

According to some embodiments, the computing device 110A can execute a conflict resolution application 108. The conflict resolution application 108 can be configured to determine that the computing device 110A is experiencing interference issues. For example, the conflict resolution application 108 can determine that the computing device 110A is experiencing an increase in packet loss rate, increased latencies, unpredictable medium access contention times, and/or other symptoms indicative of wireless interference. If such communications issues are detected, the conflict resolution application 108 can monitor for signals, such as the interfering signals 114, received by the computing device 110A that could be causing the interference issues detected by the conflict resolution application 108. The conflict resolution application 108 can analyze the interfering signals 114 to determine whether the packets 310 of the interfering signals 114 include any identification information associated with the device, such as the conflict device 120, sending the interfering signals 114. According to some embodiments, the conflict resolution application 108 determines whether the packets 310 include any identification information associated with the conflict device 120 by determining whether one or more elements of an encoded device identification message, such as the encoded device identification message 210', is embedded in the data packets 310. Since the encoded device identification message 210' can be fragmented and spread across a series of packets sent by the conflict device 120, the conflict resolution application 108 can continue to monitor and analyze the interfering signals 114 received by the computing device 110A until sufficient elements of the encoded device identification message 210' are received to determine at least a portion of the identification information associated with the conflict device 120. The conflict resolution application 108 can decode the elements of the encoded device identification message 210' to determine the identification information associated with the conflict device 120. The conflict resolution application 108 can use the identification information to take measures, such as contacting an owner/entity associated with the conflict device 120 and/or contacting the conflict device 120, to mitigate the interference issues caused by the conflict device 120.

According to some embodiments, the conflict resolution application 108 executing on the computing device 110A can generate and send a conflict report 122 to a conflict resolution server 112 in response to determining that the computing device 110A is experiencing interference issues. The conflict report 122 can include at least a portion of the identification information associated with the conflict device 120 that is determined by the computing device 110A from the elements of the encoded device identification message 210' embedded in the data packets 310 sent by the conflict device 120. The conflict resolution server 112 can execute an instance of the conflict resolution application 108 that can use the identification information of the conflict report 122 to take measures, such as contacting an owner/entity associated with the conflict device 120 and/or contacting the conflict device 120, to mitigate the interference issues caused by the conflict device 120.

According to other embodiments, the conflict report 122 sent to the conflict resolution server 112 from the computing device 110A can include a copy of the data packets 310 received by the computing device 110A from the conflict device 120. The conflict resolution application 108 executing on the conflict resolution server 112 can determine whether the data packets 310 include any identification information associated with the conflict device 120 by determining whether one or more elements of an encoded device identification message, such as the encoded device identification message 210', is embedded in the packets 310. The conflict resolution application 108 can decode the elements of the encoded device identification message 210' to determine the identification information associated with the conflict device 120. The conflict resolution application 108 can use the identification information to take measures, such as contacting an owner/entity associated with the conflict device 120 and/or contacting the conflict device 120, to mitigate the interference issues caused by the conflict device 120.

According to other embodiments, the conflict resolution server 112 can receive an indication from another computing device, such as the computing device 110B, that the computing device 110B or another device in communication with the computing device 110B is experiencing interference issues. The conflict resolution server 112 can determine a location of the computing device 110B. The location of the computing device 110B can be determined based on location information provided to the conflict resolution server 112 by the computing device 110B and/or a network device associated with the network 104. The conflict resolution server 112 can use the location of the computing device 110B to determine other computing devices, such as the computing device 110A, communicating via the network 104 that are within a proximity of the location of the computing device 110B. The conflict resolution server 112 can instruct the computing device 110A to monitor for transmissions from devices, such as the conflict device 120, and to collect information from any transmissions received by the computing device 110A. The computing device 110A can send collected information 124 about the transmissions from the conflict device 120 to the conflict resolution server 112. The collected information 124 can include identification information associated with the conflict device 120 that is determined by the computing device 110A from elements of an encoded device identification message, such as the encoded device identification message 210', embedded in packets, such as the packets 310, from the conflict device 120. Alternatively, the collected information 124 can include a copy of the packets 310 received by the computing device 110A from the conflict device 120. The conflict resolution application 108 executing on the conflict resolution server 112 can determine whether the packets 310 include any identification information associated with the conflict device 120 by determining whether one or more elements of an encoded device identification message, such as the encoded device identification message 210', is embedded in the packets 310. The conflict resolution application 108 can decode the elements of the encoded device identification message 210' to determine the identification information associated with the conflict device 120. Regardless of how the conflict resolution server 112 determines the identification information of the conflict device 120, the conflict resolution server 112 can use the identification information to take measures, such as contacting an owner/entity associated with the conflict device 120 and/or contacting the conflict device 120, to mitigate the interference issues caused by the conflict device 120

Although the ID message applications 116 is illustrated as a component of the conflict device 120 and the conflict resolution application 108 is illustrated as a component of the computing device 110A and the conflict resolution server 112, it should be understood that each of these components, or combinations thereof, can be embodied as, or in stand-alone devices or components thereof, operating as part of or in communication with the network 104 and/or the conflict resolution server 112, the computing devices 110A-110B, and the conflict device 120. As such, the illustrated embodiments should be understood as being illustrative of only some contemplated embodiments and should not be construed as being limiting in any way.

FIG. 1 illustrates one conflict resolution server 112, one network 104, two computing devices 110A-110B, and one conflict device 120. It should be understood, however, that various implementations of the operating environment 100 can include more or less of the computing devices 110A-110B, more than one of the conflict resolution server 112, more than one of the conflict device 120, and more than one of the network 104. As such, the illustrated embodiment should be understood as being illustrative, and should not be construed as being limiting in any way.

Figure 2:
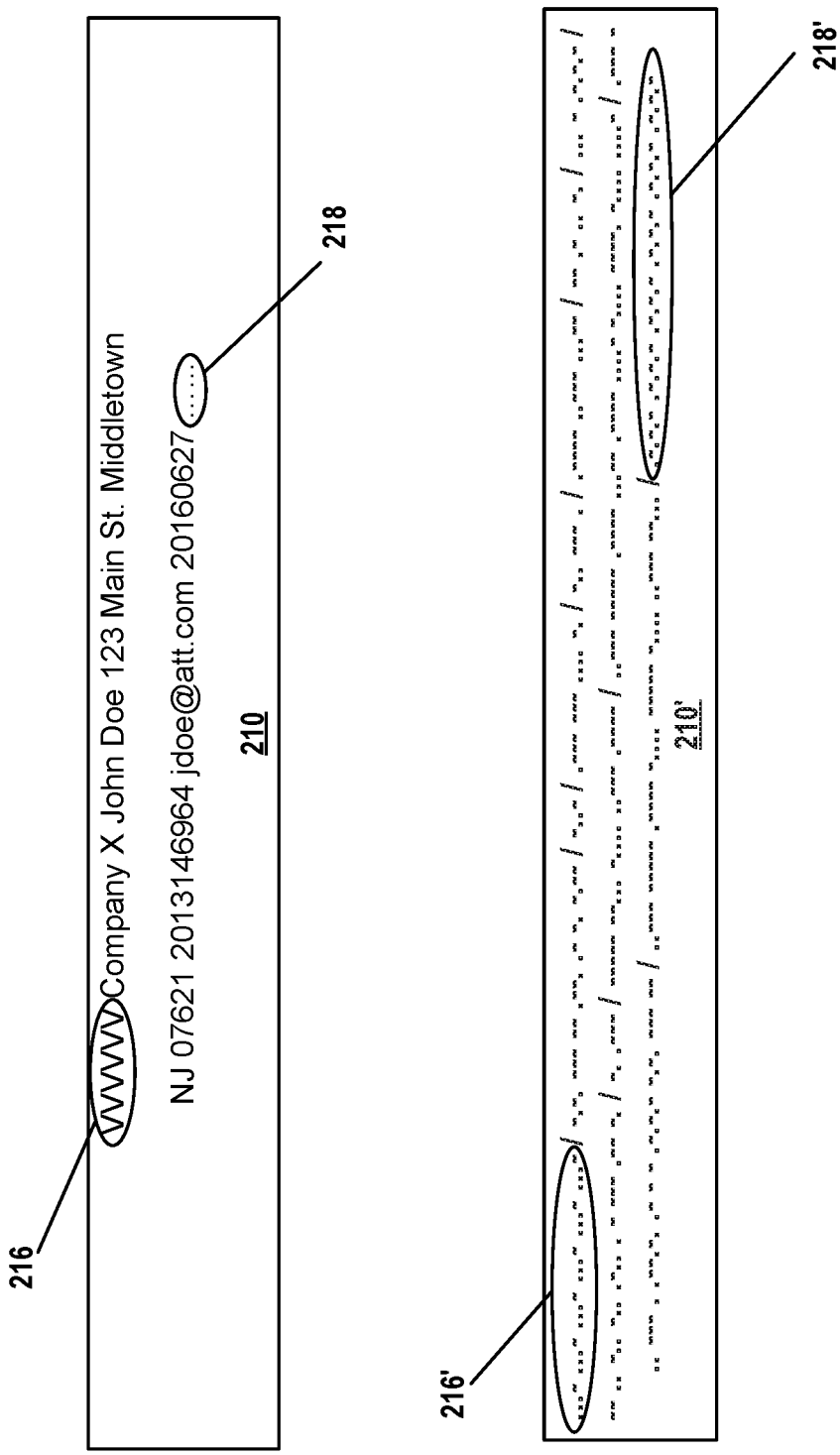
FIG. 2 is a schematic written representation of an example device identification message and a corresponding encoded version of the device identification message.

Turning now to FIG. 2, a written example of a device identification message, such as the device identification message 210, and an encoded device identification message, such as the encoded device identification message 210', created by encoding the device identification message 210 using International Morse Code based on concepts and technologies disclosed herein are shown. For illustration purposes, the device identification message 210 shows identification information for a device, such as the conflict device 120, that is owned or associated with a company, such as Company X. As such, the company name, associated employee or contact name, company address, contact phone number, contact email information, and date are included for the device identification message 210. However, it is understood that different and/or additional types of identification information can be included as desired by the owner, user and/or service provider, as discussed above with reference to FIG. 1. As an example, the identification information can include information identifying an owner of the conflict device 120; information identifying an entity associated with the conflict device 120; contact information for the owner and/or entity including, for example, an address, a telephone number, and/or an email address; an FCC FRN or other FCC type acceptance number if the conflict device 120 is a licensed device; location information of the conflict device 120, such as Global Positioning System ("GPS") coordinates of the conflict device; a model number of the conflict device 120, a serial number of the conflict device 120, a name associated with the conflict device 120, such as "sprinkler controller #2 building 3"; any other information that can be used to identify the conflict device 120 and/or a user/entity associated with the conflict device 120; and/or any combination thereof.

As also shown in FIG. 2, the device identification message 210 can include a header 216 at the beginning of the device identification message 210 and a footer 218 at the end of the device identification message 210. Similarly, the encoded device identification message 210' can include an encoded header 216' at the beginning of the encoded device identification message 210' and an encoded footer 218' at the end of the encoded device identification message 210'. The encoded header 216' is generated from encoding the header 216 using International Morse Code, and the encoded footer 218' is generated from encoding the footer 218 using International Morse Code. Providing the header 216 at the beginning of the device identification message 210 and the encoded header 216' at the beginning of the encoded device identification message 210' can ensure that the beginning of both messages is properly recognized. Providing the footer 218 at the end of the device identification message 210 and the encoded footer 218' at the end of the encoded device identification message 210' can ensure that the end of both messages is properly recognized. Since, according to embodiments, the encoded device identification message 210' is fragmented into elements for embedding into a series of transmissions, the encoded header 216' and the encoded footer 218' can be used by a device receiving the transmissions, such as the computing device 110A, to determine when the beginning and/or end, respectively, of the encoded device identification message 210' has been received. In some embodiments, a sequence of six (6) "V" characters can be used as the header 216 for the device identification message 210 to identify the beginning of the device identification message 210, and a sequence of six (6) period characters (".") can be used as the footer 218 to indicate the end of the device identification message 210. The encoded header 216' can be generated from encoding the sequence of "V" characters using International Morse Code, and the encoded footer 218' can be generated from encoding the sequence of period characters using International Morse Code. It should be understood that any characters, symbols, other elements, or combinations thereof as well as any number and pattern of characters, symbols, other elements, or combinations thereof can be used for the header 216 and the footer 218. As such, the illustrated embodiment of using "V" characters and period characters should be understood as being illustrative, and should not be construed as being limiting in any way.

Figure 3:
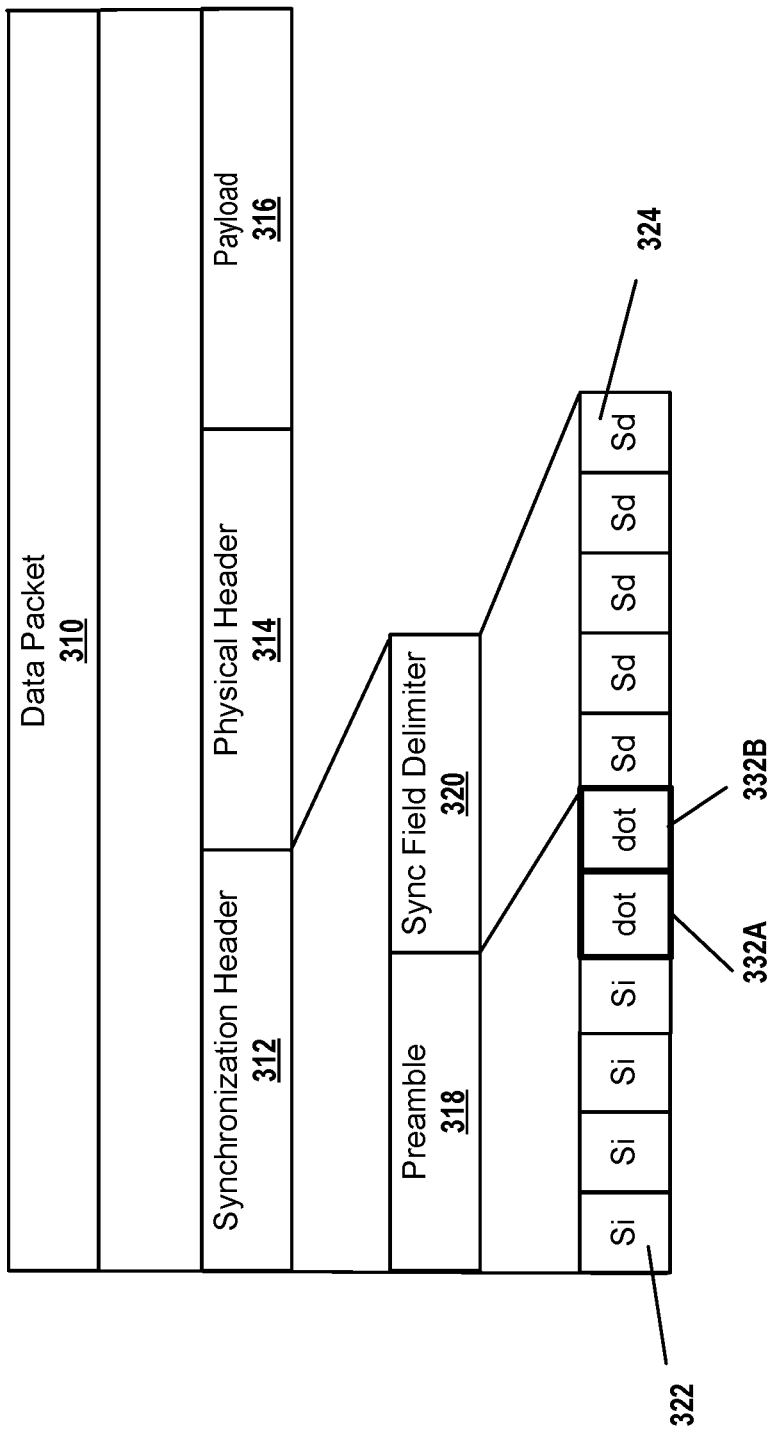
FIG. 3 schematically illustrates a data packet, according to various embodiments of the concepts and technologies described herein.

Turning now to FIG. 3, a schematic representation of a data packet 310 with embedded elements of an encoded device identification message in accordance with concepts and technologies disclosed herein is shown. Although the format of the data packet 310 illustrated in FIG. 3 is associated with a short-range communications protocol such as ZIGBEE, it should be understood that a data packet associated with any type of communications protocol that is made up of a header and a payload can be embedded with one or more elements of an encoded device identification message in accordance with the concepts and technologies disclosed herein.

As shown in FIG. 3, the data packet 310 can include a synchronization header 312, a physical header 314, and a payload 316. The data packet 310 can be sent by the conflict device 120 illustrated in FIG. 1. The synchronization header 312 can include a preamble 318 that contains information alerting a receiver that a receivable signal is present to allow the receiver to synchronize to receive the signals sent based on the communications protocol. The synchronization header 312 can further include a synchronization field delimiter 320 to indicate the end of the synchronization header 312 and the beginning of the packet data. The physical header 214 can describe a number of bytes in the payload 316 of the data packet 310. The payload 316 can include the data being transmitted via the data packet 310.

As shown in FIG. 3, the preamble 318 of the synchronization header 312 includes units of synchronization information ("Si") 322, which are arranged in a preselected sequence or pattern of symbols unique to the communications protocol being used for transmissions. The Si 322 enables a receiver to synchronize properly in order to receive the transmissions. The synchronization field delimiter 320 includes units of synchronization delimiters ("Sd") 324, which indicate the end of the synchronization header 312, after which packet data begins. According to embodiments, an encoded device identification message, such as the encoded device identification message 210', is fragmented into one or more elements 332A-332B (collectively referred to herein as "elements 332"). The one or more elements 332 of the encoded device identification message 210', can be added into the synchronization header 312. According to embodiments, the one or more elements 332 can be added to the preamble 318 of the synchronization header 312. Adding the one or more elements 332 of the encoded device identification message 210' to the synchronization header 312 increases the length of the synchronization header 312. Such an addition in the length of the synchronization header 312 can affect the time it takes to transmit data by increasing the packet overhead associated with the data packet 310. Thus, as discussed further below, the number/size of the elements 332 that the encoded device identification message 210' is fragmented into and/or the number/size of the elements 332 of the encoded device identification message 210' that can be added to the synchronization header 312 of a single data packet, such as the data packet 310, can depend on a jitter tolerance of the communications protocol and/or an operational amount of jitter experienced by the communications protocol.

Even under the most ideal network conditions, various situations can still cause delay during transmission of data packets. Thus, most communications protocols are associated with a jitter tolerance that sets forth an amount of delay in transmission that will be accommodated. During operation, devices communicating via a communications protocol generally experience an operational amount of jitter that is below the jitter tolerance of the communications protocol. Any delay experienced by the devices at or below the operational amount of jitter can be classified by the devices as noise and may be ignored by the devices. According to concepts and technologies described herein, the number/size of the elements 332 that the encoded device identification message 210' is fragmented into and/or the number/size of the encoded device identification message 210' to be added to a data packet, such as the data packet 310, can be determined by the ID message application 116 of the conflict device 120 based on the jitter tolerance for the communications protocol used by the conflict device 120 and/or the operational amount of jitter experienced during transmissions associated with the communications protocol. According to embodiments, the ID message application 116 can determine the number/size of the elements 332 that the encoded device identification message 210' is fragmented into and/or the number/size of the one or more elements 332 of the encoded device identification message 210' to be added to the synchronization header 312 such that the addition to the length of the synchronization header 312 caused by the one or more elements 332 does not increase the time it takes to transmit the data packet 310 beyond the jitter tolerance associated with the communications protocol, but does increase the time it takes to transmit the data packet 310 above the operational amount of jitter associated with the communications protocol such that the devices receiving the data packet 310 do not confuse the one or more elements 332 as noise. For example, considering FIGS. 2 and 3, the ID message application 116 can determine the number/size of the elements 332 to fragment the encoded device identification message 210' into such that the first two elements of the encoded header 216' (i.e., "dot" "dot") can be added to the synchronization header 312 without exceeding the jitter tolerance associated with the communications protocol, but exceeding the operational amount of jitter interpreted as noise.

Figure 4:
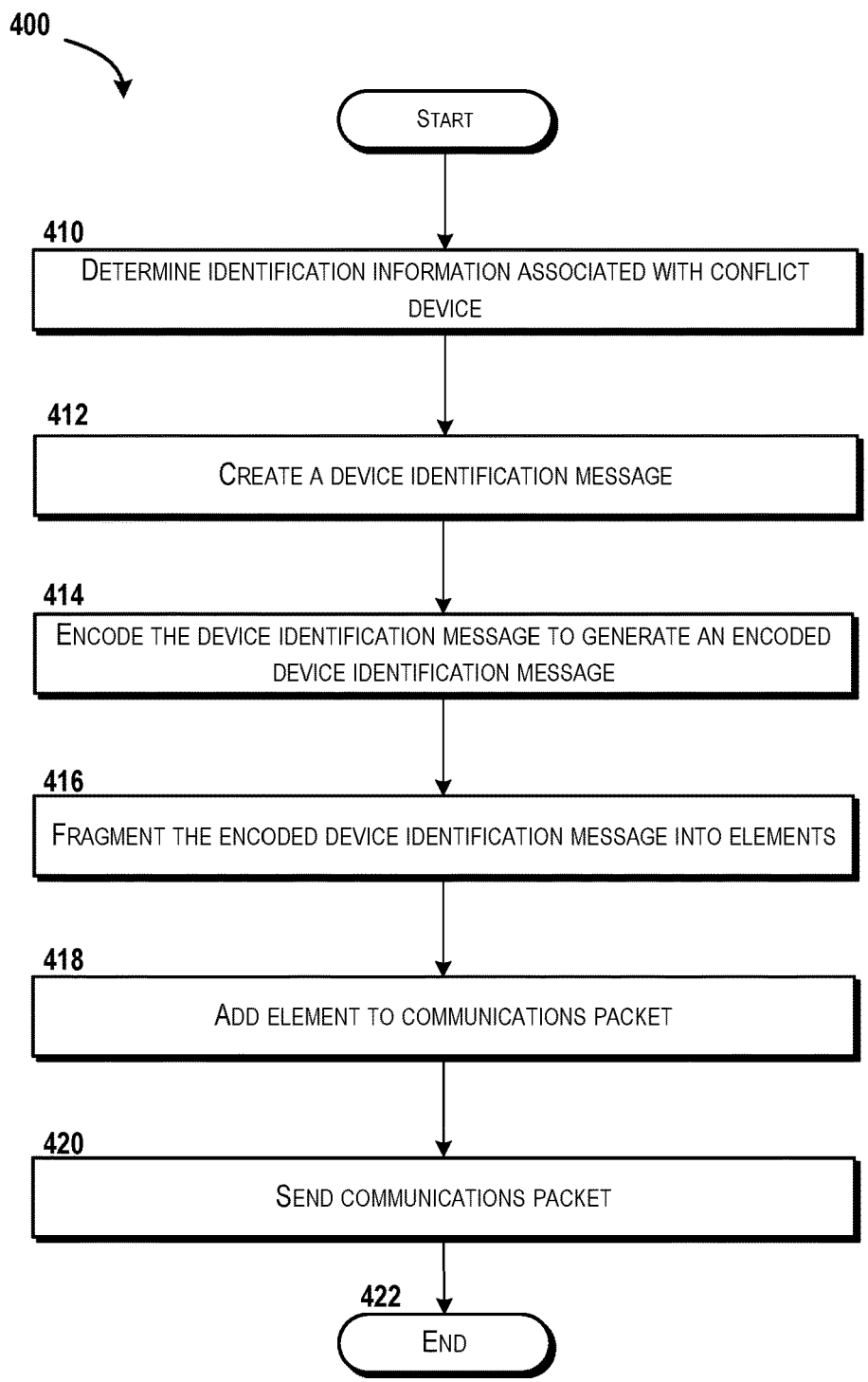
FIG. 4 is a flow diagram showing aspects of a method for creating and sending an encoded device identification message embedded in a series of data packets, according to an illustrative embodiment of the concepts and technologies described herein.

Referring now to FIG. 4, aspects of a method 400 for embedding a device identification message into packets of signals will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the conflict device 120, to perform one or more operations and/or causing the processor to direct other components of the computing system or device to perform one or more of the operations.

For purposes of illustrating and describing the concepts of the present disclosure, the method 400 is described herein as being performed by the conflict device 120 via execution of one or more software modules such as, for example, the ID message application 116. It should be understood that additional and/or alternative devices and/or network nodes including, but not limited to, the computing devices 110A-110B and the conflict resolution server 112 can provide the functionality described herein via execution of one or more modules, applications, and/or other software. Thus, the illustrated embodiments are illustrative, and should not be viewed as being limiting in any way. For discussion purposes, method 400 will be described for operations performed by the conflict device 120.

The method 400 begins at operation 410. At operation 410, the conflict device 120 can determine identification information associated with the conflict device 120. The identification information can include information identifying an owner of the conflict device 120; information identifying an entity associated with the conflict device 120; contact information for the owner and/or entity; identity and contact information for a third party service associated with the conflict device 120; any other information that can be used to identify the conflict device 120 and/or a user/entity associated with the conflict device 120; and/or any combination thereof. In some embodiments according to concepts and technologies discussed herein, the identification information can be provided to the ID message application 116 of the conflict device 120 by a user or entity, such as via the input/output devices 808 (see FIG. 8) that allow a user/entity to interface with the ID message application 116. In other embodiments, the ID message application 116 can attain the identification information from the ID message application 116 itself and/or from the conflict device 120. For example, the identification information can be hardcoded into the source code of the ID message application 116 and/or one or more other program modules executed by the conflict device 120. Additionally or alternatively, the identification information can be coded on an integrated circuit of the conflict device 120.

From operation 410, the method 400 can proceed to operation 412, where the conflict device 120 can create a device identification message, such as the device identification message 210. The device identification message 210 can be based on at least a portion of the identification information that the conflict device 120 receives and/or determines. The device identification message 210 can be created based on a standard format for the type of the conflict device 120 and/or the network 104. Alternatively, the device identification message 210 can be created based on a specific format entered by a user, owner, and/or administrator associated with the conflict device 120. For example, the ID message application 116 can include a standardized basic or default format for the device identification message 210 including information that identifies the type of the conflict device 120, the name of the owner or administrative contact associated with the conflict device 120, a company or organization name associated with the conflict device 120, the company/organization address, and/or email and telephone contact information. In some embodiments, a specific header, such as the header 216, can be added to the beginning of the device identification message 210 to identify the beginning of the device identification message 210. A specific footer, such as the footer 218, can be added to the end of the device identification message 210 to identify the end of the device identification message 210.

From operation 412, the method 400 can proceed to operation 414, where the conflict device 120 can encode the device identification message 210 using a compact code to generate an encoded device identification message, such as the encoded device identification message 210'. The compact code used to encode the device identification message 210 to generate the encoded device identification message 210' can be International Morse Code, American Standard Code for Information Interchange ("ASCII"), or any other code that can be fragmented into elements capable of being added to one or more packets sent by the conflict device 120. Based on the header 216 and the footer 218 of the device identification message 210, the encoded device identification message 210' can include an encoded header, such as the encoded header 216', and an encoded footer, such as the encoded footer 218'. The encoded header 216' and the encoded footer 218' can be helpful during transmission/reception of the elements of the encoded device identification message 210' to assist a receiving device, such as the computing device 110A, in properly recognized the beginning and end, respectively, of the encoded device identification message 210'.

From operation 414, the method 400 can proceed to operation 416, where the conflict device 120 can fragment the encoded device identification message 210' into elements. The conflict device 120 can determine the number/size of the elements 332 that the encoded device identification message 210' is fragmented into based on a jitter tolerance and an operational amount of jitter experienced during transmissions associated with the communications protocol being used by the conflict device 120. According to embodiments, the ID message application 116 can determine the number/size of the elements 332 that the encoded device identification message 210' is fragmented into such that, when one or more of the elements is added to a data packet, such as the data packet 310, the addition does not increase the time it takes to transmit the data packet 310 beyond the jitter tolerance associated with the communications protocol, but does increase the time it takes to transmit the data packet 310 above the operational amount of jitter associated with the communications protocol such that the devices receiving the data packet 310 do not confuse the one or more elements 332 as noise.

From operation 416, the method 400 can proceed to operation 418, where the conflict device 120 can add the elements 332 of the encoded device identification message 210' to the data packets 310 sent by the conflict device 120. According to embodiments, one more of the elements 332 of the encoded device identification message 210' can be added into a synchronization header, such as the synchronization header 312, of the data packet 310. Adding one or more of the elements 332 of the encoded device identification message 210' to the synchronization header 312 increases the length of the synchronization header 312. Such an addition in the length of the synchronization header 312 can affect the time it takes to transmit data by increasing the packet overhead associated with the data packet 310. Thus, the number/size of the elements 332 of the encoded device identification message 210' that can be added to the synchronization header 312 of the data packet 310 can depend on a jitter tolerance of the communications protocol and/or an operational amount of jitter experienced by the communications protocol. According to embodiments, the ID message application 116 can determine the number/size of the one or more elements 332 of the encoded device identification message 210' to be added to the synchronization header 312 such that the addition to the length of the synchronization header 312 caused by the one or more elements 332 does not increase the time it takes to transmit the data packet 310 beyond the jitter tolerance associated with the communications protocol, but does increase the time it takes to transmit the data packet 310 above the operational amount of jitter associated with the communications protocol such that the devices receiving the data packet 310 do not confuse the one or more elements 332 as noise.

From operation 418, the method 400 can proceed to operation 420, where the ID message application 116 can send the data packet 310 with one or more of the elements 332 of the encoded device identification message 210' embedded. The ID message application 116 can continue to add and send one or more of the elements 332 of the encoded device identification message 210' in data packets sent by the conflict device 120. As such, the encoded device identification message 210' can be sent, element-by-element, within a series of data packets from the conflict device 120. Other devices, such as the computing device 110A, that receive transmissions sent by the conflict device 120 can determine, from the elements 332 embedded in the data packets of the interfering signals 114 of the conflict device 120, identification information associated with the conflict device 120. From operation 420, the method 400 proceeds to operation 422, where the method 400 ends.

Figure 5:
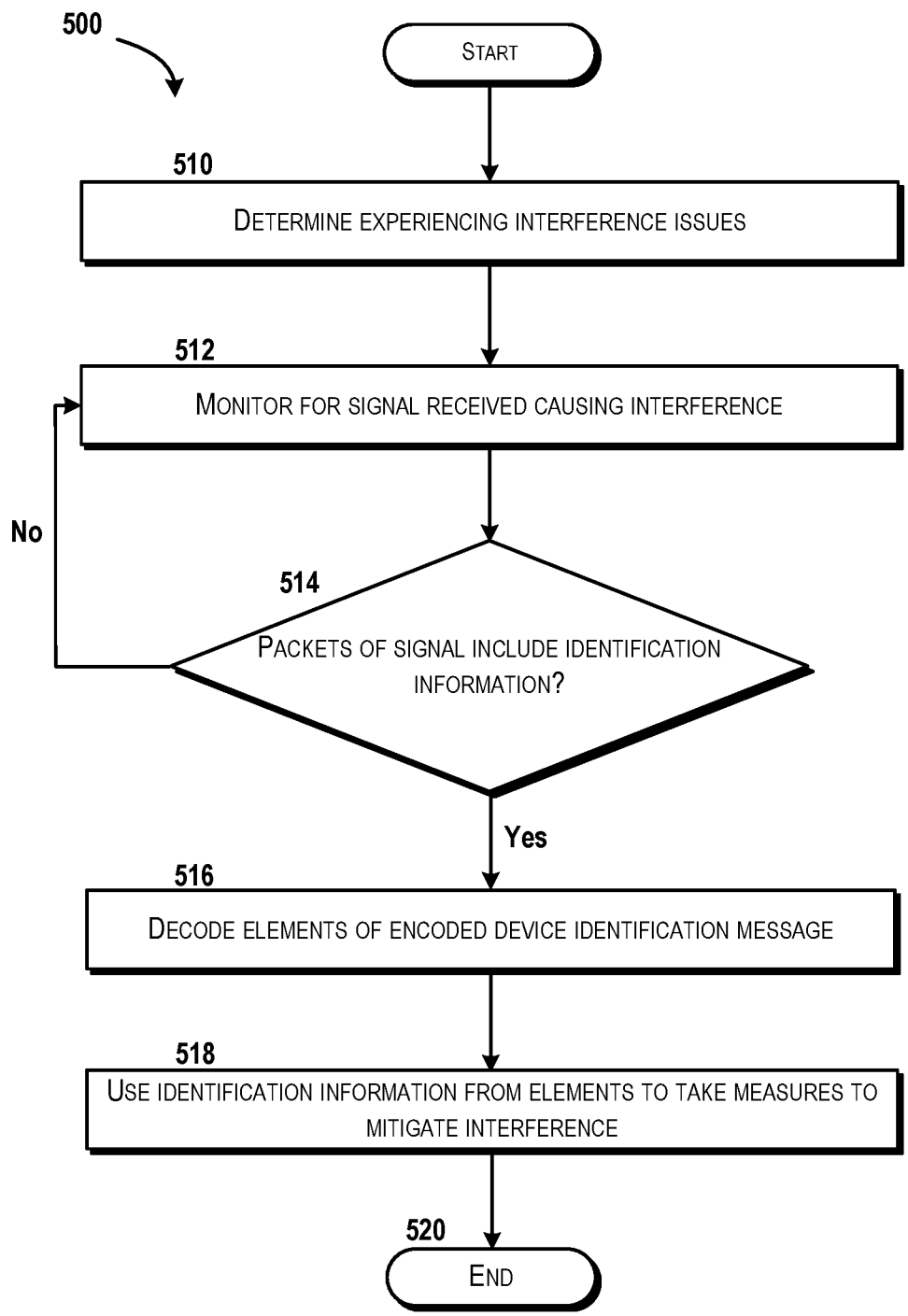
FIG. 5 is a flow diagram showing aspects of a method for resolving conflicts caused by interference situations using the encoded device identification message embedded in a series of data packets, according to an illustrative embodiment of the concepts and technologies described herein.

Turning now to FIG. 5, aspects of a method 500 for resolving network conflicts using a device information message will be described in detail, according to an illustrative embodiment. For purposes of illustrating and describing the concepts of the present disclosure, the method 500 is described herein as being performed by the computing device 110A via execution of one or more software modules such as, for example, the conflict resolution application 108. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 500 begins at operation 510, where the computing device 110A can determine that the computing device 110A is experiencing interference issues. For example, the computing device 110A can determine that it is experiencing an increase in packet loss rate, increased latencies, unpredictable medium access contention times, and/or other symptoms indicative of wireless interference. From operation 510, the method 500 proceeds to operation 512, where the computing device 110A, in response to determining that it is experiencing interference issues, can monitor for any signals received by the computing device 110A that may be causing the interference issues. For example, the computing device 110A can monitor for signals received during or proximate to times when the computing device 110A is experiencing interference issues.

From operation 512, the method 500 proceeds to operation 514, where the computing device 110A can analyze signals received to determine whether data packets 310 of the signals include any identification information associated with the device sending the signals. According to some embodiments, the computing device 110A determines whether the data packets 310 include any identification information associated with the device sending the data packets 310 by determining whether one or more elements of an encoded device identification message, such as the encoded device identification message 210', is embedded in the packets. If the computing device 110A determines that the data packets 310 do not include any identification information, the method 500 can proceed back to operation 512, where the computing device 110A continues to monitor for signals that could be causing the interference issues experienced by the computing device 110A. If the computing device 110A determines that the packets do include identification information, the method 500 can proceed to operation 516.

At operation 516, the computing device 110A can decode the elements of the encoded device identification message 210' to determine the identification information associated with the device, such as the conflict device 120, sending the data packets. Since the encoded device identification message 210' can be fragmented and spread across a series of data packets, the computing device 110A can continue to monitor and analyze signals received until sufficient elements of the encoded device identification message 210' are received to determine at least a portion of the identification information associated with the conflict device 120. From operation 516, the method 500 proceeds to operation 518, where the computing device 110A can use the identification information to take measures, such as contacting an owner/entity associated with the conflict device 120 and/or contacting the conflict device 120, to mitigate the interference issues caused by the conflict device 120. From operation 518, the method 500 proceeds to operation 520, where the method 500 ends.

Figure 6:
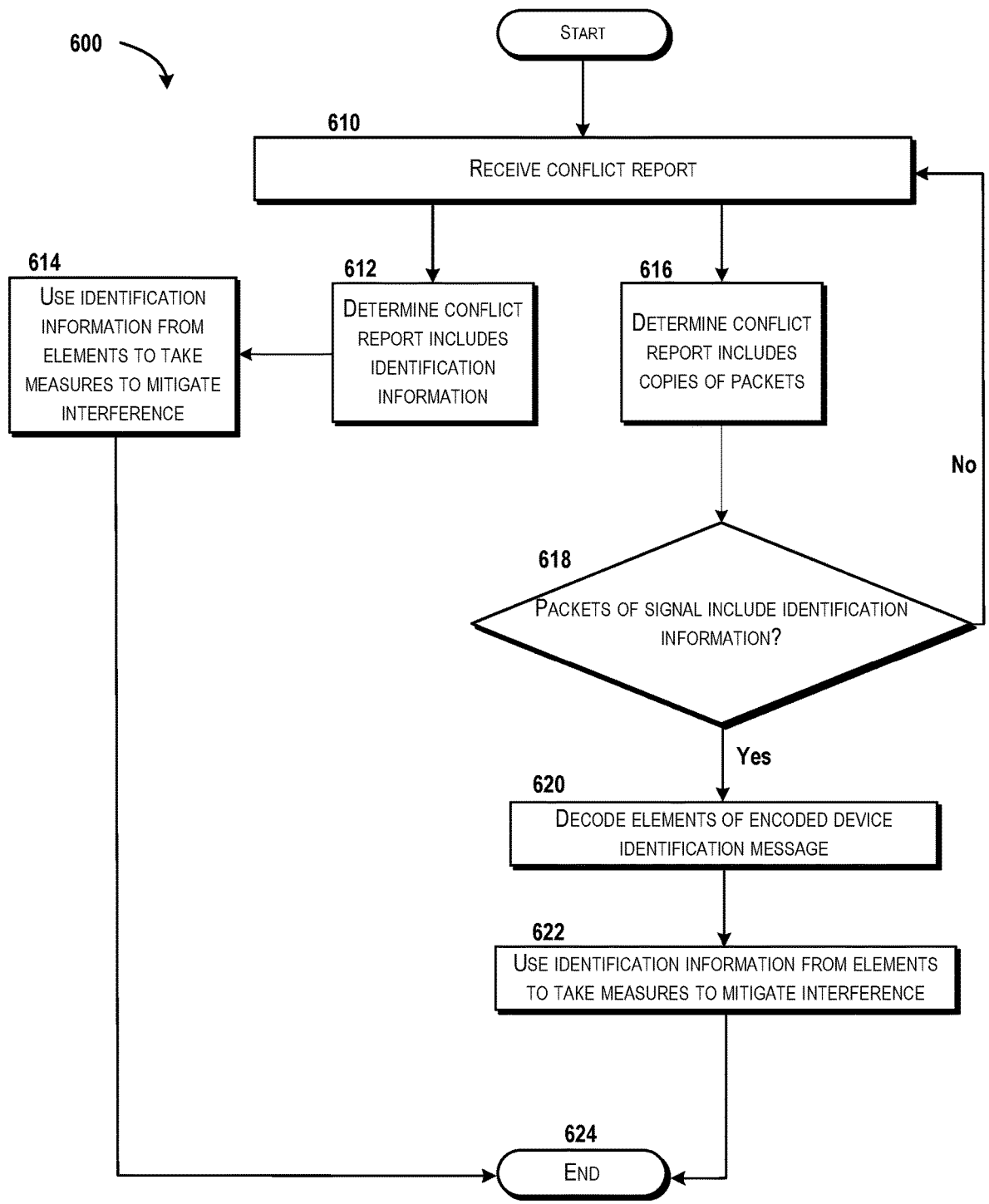
FIG. 6 is a flow diagram showing aspects of a method for resolving conflicts caused by interference situations using the encoded device identification message embedded in a series of data packets, according to another illustrative embodiment of the concepts and technologies described herein.

Turning now to FIG. 6, aspects of a method 600 for resolving network conflicts using a device information message will be described in detail, according to another illustrative embodiment. For purposes of illustrating and describing the concepts of the present disclosure, the method 600 is described herein as being performed by the conflict resolution server 112 via execution of one or more software modules such as, for example, the conflict resolution application 108. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 600 begins at operation 610, where the conflict resolution server 112 can receive a conflict report, such as the conflict report 122, from a device experiencing interference issues, such as the computing device 110A. The conflict report 122 can include at least a portion of the identification information associated with the conflict device 120 that is determined by the computing device 110A from the elements of the encoded device identification message 210' embedded in the data packets 310 of the interfering signals 114 sent by the conflict device 120. According to other embodiments, the conflict report 122 can include a copy of the data packets 310 received by the computing device 110A from the conflict device 120. If, at operation 612, the conflict report 122 is determined to include identification information associated with the conflict device 120 determined by the computing device 110A from the elements of the encoded device identification message 210' embedded in the data packets 310 sent by the conflict device 120, the method 600 proceeds to operation 614, where the conflict resolution server 112 can use the identification information of the conflict report 122 to take measures, such as contacting an owner/entity associated with the conflict device 120 and/or contacting the conflict device 120, to mitigate the interference issues caused by the conflict device 120. From operation 614, the method 600 proceeds to operation 624, where the method 600 ends.

If, at operation 616, the conflict resolution server 112 determines that the conflict report 122 includes a copy of the data packets 310 received by the computing device 110A, the method 600 proceeds to operation 618, where the conflict resolution server 112 can analyze the data packets 310 to determine whether the data packets 310 include any identification information associated with the device sending the signals. According to some embodiments, the conflict resolution server 112 determines whether the data packets 310 include any identification information associated with the device sending the packets by determining whether one or more elements of an encoded device identification message, such as the encoded device identification message 210', is embedded in the data packets 310. If the conflict resolution server 112 determines that the data packets 310 do not include any identification information, the method 600 can proceed back to operation 610, where the conflict resolution server 112 can receive another conflict report. If the conflict resolution server 112 determines that the data packets 310 do include identification information, the method 600 can proceed to operation 620.

At operation 620, the conflict resolution server 112 can decode the elements of the encoded device identification message 210' to determine the identification information associated with the device sending the data packets 310, such as the conflict device 120. From operation 620, the method 600 proceeds to operation 622, where the conflict resolution server 112 can use the identification information to take measures, such as contacting an owner/entity associated with the conflict device 120 and/or contacting the conflict device 120, to mitigate the interference issues caused by the conflict device 120. From operation 622, the method 600 proceeds to operation 624, where the method 600 ends.

Figure 7:
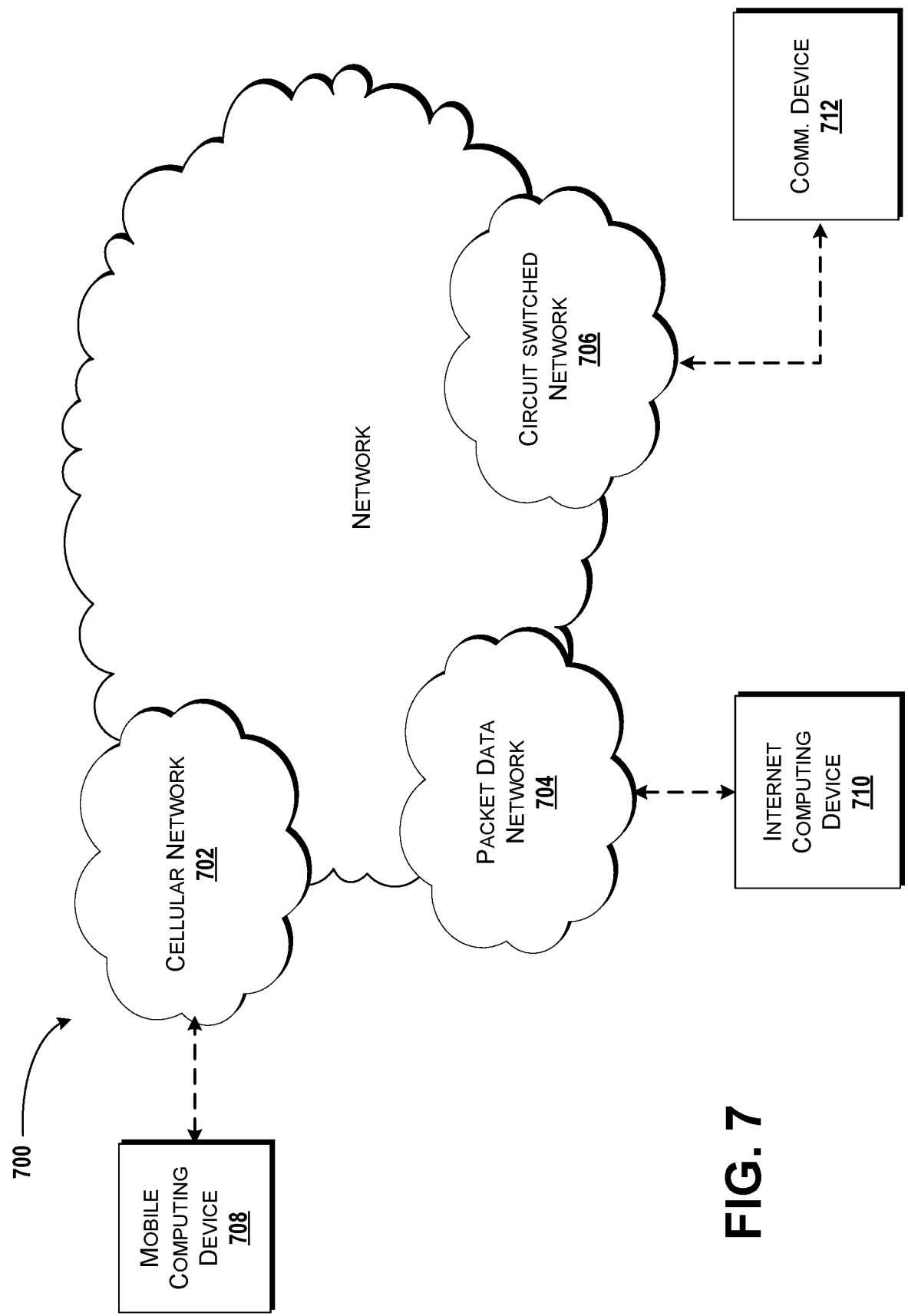
FIG. 7 schematically illustrates a network, according to an illustrative embodiment of the concepts and technologies described herein.

Turning now to FIG. 7, details of a network 700 are illustrated, according to an illustrative embodiment. The network 700 includes a cellular network 702, a packet data network 704, for example, the Internet, and a circuit switched network 706, for example, a publicly switched telephone network ("PSTN"). The network 700 can include the network 104 illustrated and described with reference to FIG. 1.

The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, the computing devices 110A-110B, the conflict device 120, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards as well as evolved and future mobile standards.

The packet data network 704 includes various devices, for example, the conflict resolution server 112, servers, computers, databases, and other devices in communication with another. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system (POTS). The functionality of a circuit switched network 706 or other circuit-switched network are generally known and will not be described herein in detail.

The illustrated cellular network 702 is shown in communication with the packet data network 704 and the circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and there through to the packet data network 704 and/or the cellular network 702. It should be appreciated that the communications device 712 can be an Internet-capable device, and can be substantially similar to the Internet-capable device 710. In the specification, the network 104 is used to refer broadly to any combination of the networks 702, 704, 706. It should be appreciated that substantially all of the functionality described with reference to the network 104 can be performed by the cellular network 702, the packet data network 704, and/or the circuit switched network 706, alone or in combination with other networks, network elements, and the like.

Figure 8:
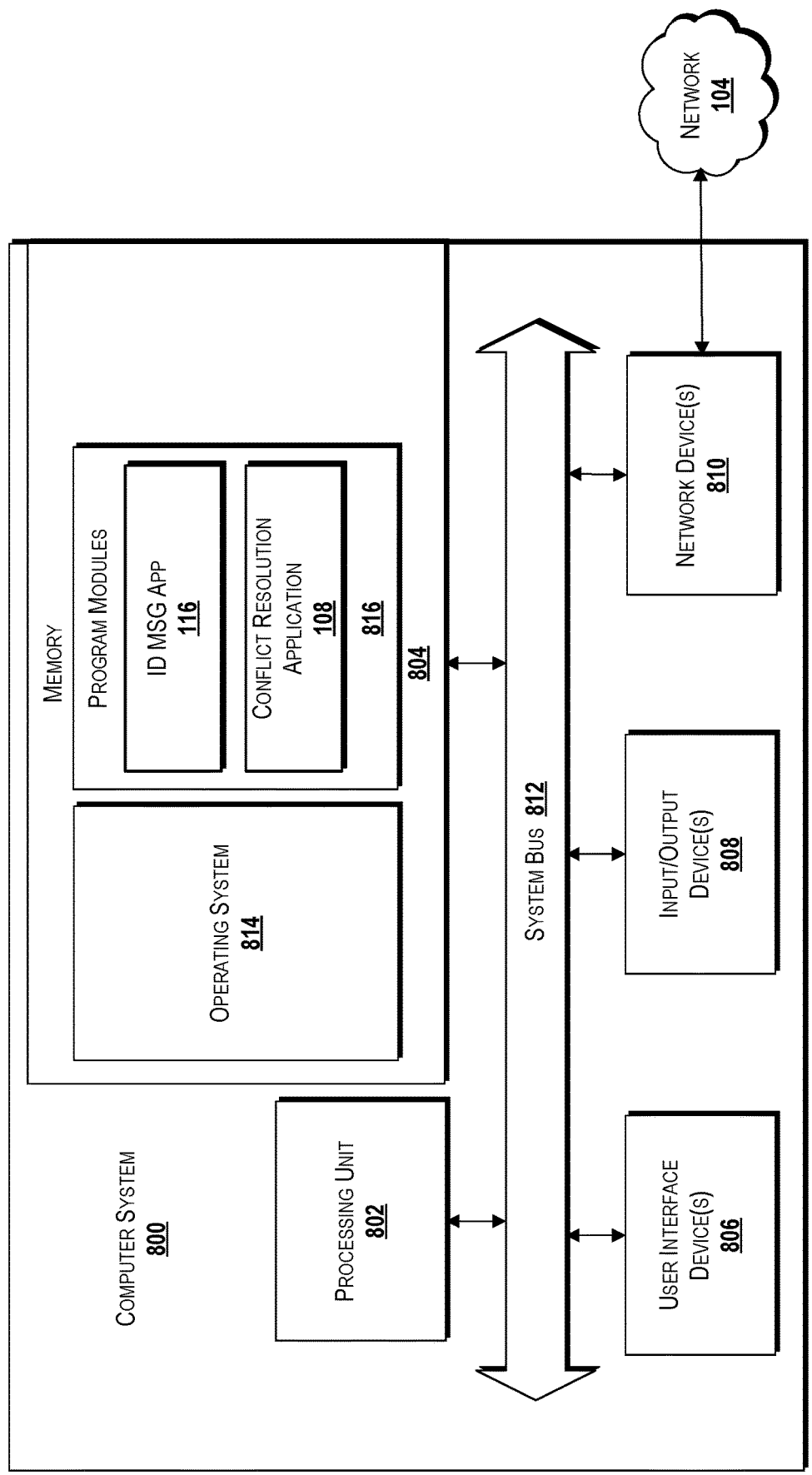
FIG. 8 is a block diagram illustrating an example server and/or computing device configured to create and send encoded device identification messages and to resolve network conflicts using the encoded device identification messages, according to some illustrative embodiments of the concepts and technologies described herein.

FIG. 8 is a block diagram illustrating a computer system 800 configured to provide the functionality described herein for a device identification message embedded in a packet stream and network conflict resolution using the same, in accordance with various embodiments of the concepts and technologies disclosed herein, which can represent the conflict resolution server 112, the computing devices 110A-110B, and the conflict device 120. The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 include the ID message application 116 and/or the conflict resolution application 108 shown in FIG. 1. These and/or other programs can be embodied in computer-readable media containing instructions that, when executed by the processing unit 802, perform one or more of the methods 500, 600, and 700 described in detail above with respect to FIGS. 5-7 and/or other functionality as illustrated and described herein. It can be appreciated that, at least by virtue of the instructions embodying the methods 500, 600, and 700 and/or other functionality illustrated and described herein being stored in the memory 804 and/or accessed and/or executed by the processing unit 802, the computer system 800 is a special-purpose computing system that can facilitate providing the functionality illustrated and described herein. According to embodiments, the program modules 816 may be embodied in hardware, software, firmware, or any combination thereof.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network, such as the network 104. Examples of the network devices 810 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for a device identification message embedded in a packet stream and conflict resolution using the same have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A method comprising:
 creating, by a computing device, a device identification message based on at least a portion of identification information associated with the computing device;
 encoding, by the computing device, the device identification message using a compact code to generate an encoded device identification message;
 fragmenting, by the computing device, the encoded device identification message into a plurality of elements;
 determining, by the computing device, a number of elements of the plurality of elements of the encoded device identification message to add to a data packet to be sent by the computing device based on a jitter tolerance of a communications protocol associated with the data packet and an operational amount of jitter of the communications protocol associated with the data packet such that the number of elements of the plurality of elements of the encoded device identification message determined to be added to the data packet does not increase a time to send the data packet beyond the jitter tolerance of the communications protocol but does increase the time to send the data packet above the operational amount of jitter of the communications protocol such that a device receiving the data packet does not confuse the number of elements of the plurality of elements of the encoded device identification message added to the data packet as noise, wherein the number of elements of the plurality of elements of the encoded device identification message represents a portion of the encoded device identification message;

adding, by the computing device, the number of elements of the plurality of elements of the encoded device identification message to the data packet to be sent by the computing device; and sending, by the computing device, the data packet comprising the number of elements of the plurality of elements of the encoded device identification message added by the computing device.

2. The method of claim 1, wherein the data packet is one of a series of data packets, and wherein the method further comprises adding, in an order associated with the encoded device identification message, a respective number of elements of the plurality of elements to each of a remainder of the series of data packets such that the encoded device identification message is sent via the series of data packets.

3. The method of claim 2, wherein a device that receives the series of data packets sent by the computing device uses the encoded device identification message provided via the series of data packets to mitigate interference caused by the computing device.

4. The method of claim 1, wherein the compact code comprises International Morse Code.

5. The method of claim 1, wherein adding the number of elements of the plurality of elements to the data packet comprises adding the number of elements of the plurality of elements to a synchronization header of the data packet.

6. The method of claim 1, further comprising:
prior to creating the device identification message, determining whether at least the portion of the identification information associated with the computing device is available; and
if at least the portion of the identification information associated with the computing device is not available, rendering the computing device nonoperational.

7. The method of claim 1, wherein the identification information comprises at least one of information identifying an owner of the computing device, information identifying an entity associated with the computing device, contact information for the owner of the computing device, contact information for the entity associated with the computing device, or location information associated with the computing device.

8. A computing device comprising:
a processor; and
a memory that stores computer-executable instructions that, when executed by the processor, causes the processor to perform operations comprising:
creating a device identification message based on at least a portion of identification information associated with the computing device,
encoding the device identification message using a compact code to generate an encoded device identification message,
fragmenting the encoded device identification message into a plurality of elements,
determining a number of elements of the plurality of elements of the encoded device identification message to add to a data packet to be sent by the computing device based on a jitter tolerance of a communications protocol associated with the data packet and an operational amount of jitter of the communications protocol associated with the data packet such that the number of elements of the plurality of elements of the encoded device identification message determined to be added to the data packet does not increase a time to send the data packet beyond the jitter tolerance of the communications protocol but does increase the time to send the data packet above the operational amount of jitter of the communications protocol such that a device receiving the data packet does not confuse the number of elements of the plurality of elements of the encoded device identification message added to the data packet as noise, wherein the number of elements of the plurality of elements of the encoded device identification message represents a portion of the encoded device identification message,
adding the number of elements of the plurality of elements of the encoded device identification message to the data packet to be sent by the computing device, and
sending the data packet comprising the number of elements of the plurality of elements of the encoded device identification message added by the computing device.

9. The computing device of claim 8, wherein the data packet is one of a series of data packets, and wherein the operations further comprise adding, in an order associated with the encoded device identification message, a respective number of elements of the plurality of elements to each of a remainder of the series of data packets such that the encoded device identification message is sent via the series of data packets.

10. The computing device of claim 9, wherein a device that receives the series of data packets sent by the computing device uses the encoded device identification message provided via the series of data packets to mitigate interference caused by the computing device.

11. The computing device of claim 8, wherein the compact code comprises International Morse Code.

12. The computing device of claim 8, wherein adding the number of elements of the plurality of elements to the data packet comprises adding the number of elements of the plurality of elements to a synchronization header of the data packet.

13. The computing device of claim 8, wherein the operations further comprise:
prior to creating the device identification message, determining whether at least the portion of the identification information associated with the computing device is available; and
if at least the portion of the identification information associated with the computing device is not available, rendering the computing device nonoperational.

14. The computing device of claim 8, wherein the identification information comprises at least one of information identifying an owner of the computing device, information identifying an entity associated with the computing device, contact information for the owner of the computing device, contact information for the entity associated with the computing device, or location information associated with the computing device.

15. A computer-readable storage medium comprising computer-executable instructions that, when executed by a processor of a computing device, cause the processor to perform operations comprising:
- creating a device identification message based on at least a portion of identification information associated with the computing device;
- encoding the device identification message using a compact code to generate an encoded device identification message;
- fragmenting the encoded device identification message into a plurality of elements;
- determining a number of elements of the plurality of elements of the encoded device identification message to add to a data packet to be sent by the computing device based on a jitter tolerance of a communications protocol associated with the data packet and an operational amount of jitter of the communications protocol associated with the data packet such that the number of elements of the plurality of elements of the encoded device identification message determined to be added to the data packet does not increase a time to send the data packet beyond the jitter tolerance of the communications protocol but does increase the time to send the data packet above the operational amount of jitter of the communications protocol such that a device receiving the data packet does not confuse the number of elements of the plurality of elements of the encoded device identification message added to the data packet as noise, wherein the number of elements of the plurality of elements of the encoded device identification message represents a portion of the encoded device identification message;
- adding the number of elements of the plurality of elements of the encoded device identification message to the data packet to be sent by the computing device; and
- sending the data packet comprising the number of elements of the plurality of elements of the encoded device identification message added by the computing device.

16. The computer-readable storage medium of claim 15, wherein the data packet is one of a series of data packets, and wherein the operations further comprise adding, in an order associated with the encoded device identification message, a respective number of elements of the plurality of elements to each of a remainder of the series of data packets p such that the encoded device identification message is sent via the series of data packets.

17. The computer-readable storage medium of claim 16, wherein a device that receives the series of data packets sent by the computing device uses the encoded device identification message provided via the series of data packets to mitigate interference caused by the computing device.

18. The computer-readable storage medium of claim 15, wherein adding the number of elements of the plurality of elements to the data packet comprises adding the number of elements of the plurality of elements to a synchronization header of the data packet.

19. The computer-readable storage medium of claim 15, wherein the operations further comprise:
- prior to creating the device identification message, determining whether at least the portion of the identification information associated with the computing device is available; and
- if at least the portion of the identification information associated with the computing device is not available, rendering the computing device nonoperational.

20. The computer-readable storage medium of claim 15, wherein the identification information comprises at least one of information identifying an owner of the computing device, information identifying an entity associated with the computing device, contact information for the owner of the computing device, contact information for the entity associated with the computing device, or location information associated with the computing device.

* * * * *